United States Patent Office 3,808,127
Patented Apr. 30, 1974

3,808,127
RED PHOSPHORUS IMPREGNATED
WITH TRIOXANE
Bruno Sander, Albrecht Hilt, Hugo Fuchs, and Anton Cadus, Ludwigshafen, Germany, assignors to Badische Anilin- & Soda-Fabrik Aktiengesellschaft, Ludwigshafen (Rhine), Germany
No Drawing. Filed May 17, 1972, Ser. No. 253,938
Claims priority, application Germany, June 9, 1971, P 21 28 582.5
Int. Cl. B27k 3/00; C09d 5/18; C09k 3/28
U.S. Cl. 252—8.1
6 Claims

ABSTRACT OF THE DISCLOSURE

Red phosphorus impregnated with trioxane in a weight ratio in the range of 80:20 to 20:80. In particular, a mixture of from 40 to 60% by weight of particulate red phosphorus and from 60 to 40% by weight of trioxane.

The invention relates to red phosphorus impregnated with trioxane and its use for the production of flame-resistant thermoplastic compositions.

It is known that powdered red phosphorus may be incorporated in an amount of from 1 to 15% by weight (based on the end product) into thermoplastics to make them flame-retardant. Powdered red phosphorus as a rule contains large amounts of very fine particles (smaller than 0.15 mm.) which tend to form dust in use. This is a considerable disadvantage in processing. Moreover red phosphorus may readily ignite in contact with hot surfaces of processing machines and in the presence of humidity, and this constitutes a considerable fire risk.

It is known that red phosphorus can be coated with paraffin wax or wax to protect it from the action of air and moisture. It is also known in the art that red phosphorus can be brought into a nondusting, free-flowing form by impregnation with a lactam.

The said mixtures have the disadvantage that they cannot be universally used because the impregnants have low volatility and some of them may even polymerize and remain in the plastics composition. The properties of the desired thermoplastics may be unfavorably affected in this way.

We have now found that red phosphorus can be incorporated into a thermoplastic without the formation of dust, without the risk of ignition and without the other disadvantages enumerated above when it is previously impregnated with trioxane.

The invention therefore consists in red phosphorus impregnated with trioxane. The red phosphorus is preferably in a finely divided form, particularly in the form of particles having a mean size of from 0.01 to 0.15 mm. The ratio by weight of trioxane to red phosphorus is usually from 80:20 to 20:80 and preferably in the range from 60:40 to 40:60.

It is a special advantage of red phosphorus which has been impregnated in accordance with the invention that the impregnant trioxane, owing to its low boiling point (116° C.), can be rapidly and completely removed from the thermoplastics melt after the impregnated red phosphorus has been incorporated. The phosphorus is thus uniformly distributed in the thermoplastics melt. Moreover the phosphorus-filled thermoplastic is obtained free from the impregnant which could change its properties. The separation of the trioxane from the plastics melt may be carried out at atmospheric or subatmospheric pressure. The trioxane thus escaping can be recovered without difficulty by condensation or absorption in water.

Trioxane to be used according to the invention may conveniently be stabilized with an alkaline reacting substance as for example triethylamine, triethanolamine or the like in an amount of from about 10 to 200 p.p.m., and an antioxidant such as 2,6-ditert-butyl-p-cresol, in an amount of from 50 to 150 p.p.m.

The impregnation of the red phosphorus in accordance with the invention is advantageously carried out as follows: Powdered red phosphorus is introduced into liquid stabilized trioxane while stirring, for example at 80° C. After vigorous mixing the suspension is run off from the stirred vessel and, in order to prevent sedimentation of the red phosphorus, is caused to solidify while being continually moved. This may take place either in a screw or in a plastics hose which is kept in continuous movement. The process may be carried out batchwise or continuously.

It is also possible to mix the powdered red phosphorus vigorously with the trioxane flakes in a tumbler mixer. Very fine particles of red phosphorus are thus impregnated by subliming trioxane.

In all cases a product is obtained which is devoid of dust and is free-flowing.

The following are thermoplastics which can be given a flame-resistant finish using a mixture of red phosphorus and trioxane in accordance with the invention: polyamides, polyurethanes, polyacetals and saturated polyesters and also homopolymers and copolymers of olefinically unsaturated monomers such as polymers of styrene and acrylonitrile or propylene polymers.

Incorporation of the red phosphorus impregnated according to the invention into the thermoplastics is carried out by mixing on an extruder with simultaneous or subsequent devolatilization. The two components may either be premixed in a mixer and fed together into the hopper of the extruder or fed into the same separately.

The mixture of phosphorus and trioxane may however also be incorporated into the plastics melt in the extruder.

Fillers such as glass fibers, chalk, asbestos and the like may be added to the thermoplastics separately or together with the mixture of phosphorus and trioxane, e.g., by using impregnated red phosphorus which also contains one or more fillers.

We claim:
1. Red phosphorus impregnated with trioxane in a weight ratio in the range of 80:20 to 20:80.
2. Impregnated red phosphorus as claimed in claim 1 and consisting essentially of from 40 to 60% by weight of finely divided red phosphorus and from 60 to 40% by weight of trioxane.
3. Impregnated red phosphorus as claimed in claim 1 in which the particles of red phosphorus have a mean particle size of from 0.01 to 0.15 mm.
4. Impregnated red phosphorus as claimed in claim 1 in which the trioxane used has been stabilized with an alkaline reacting substance and an antioxidant.
5. Impregnated red phosphorus as claimed in claim 1 which also contains one or more fillers.
6. Impregnated red phosphorus as claimed in claim 1 wherein the dioxane is stabilized with 10 to 200 p.p.m. of an alkaline reacting substance and from 50 to 150 p.p.m. of an antioxidant.

References Cited
UNITED STATES PATENTS

| 1,433,100 | 10/1922 | Sadtler | 423—265 |
| 2,399,120 | 4/1946 | Hurd | 423—268 |
| 3,663,174 | 5/1972 | Dany et al. | 423—322 |

OSCAR R. VERTIZ, Primary Examiner

G. A. HELLER, Assistant Examiner

U.S. Cl. X.R.

106—15 FP; 117—137; 423—265, 322